United States Patent

Nishikawa et al.

[11] Patent Number: 4,669,325
[45] Date of Patent: Jun. 2, 1987

[54] TELESCOPIC ASSEMBLY

[75] Inventors: Masumi Nishikawa; Masanobu Ishikawa; Hiroshi Watanabe, all of Kariya; Kenichi Kikuchi; Sumio Takizawa, both of Toyota, all of Japan

[73] Assignees: Aisin Seiki Kabushiki Kaisha; Toyota Jidosha Kabushiki Kaisha, both of Kariya, Japan

[21] Appl. No.: 792,569

[22] Filed: Oct. 29, 1985

[30] Foreign Application Priority Data

Oct. 30, 1984 [JP] Japan ................................. 59-226919

[51] Int. Cl.[4] ......................... B62D 1/18; F16H 25/24; F16C 23/00
[52] U.S. Cl. ..................................... 74/89.15; 74/397; 74/493; 384/252
[58] Field of Search ............... 74/89.15, 424.8 R, 397, 74/493; 384/247, 249, 252, 260; 280/775

[56] References Cited

U.S. PATENT DOCUMENTS

| | | | |
|---|---|---|---|
| 1,269,750 | 6/1918 | Saal | 384/249 |
| 1,887,336 | 11/1932 | Spearman | 384/260 |
| 2,513,643 | 7/1950 | Griner | 384/252 X |
| 3,396,600 | 8/1968 | Zeigler et al. | 74/493 |
| 3,504,954 | 4/1970 | Robson | 384/252 |

FOREIGN PATENT DOCUMENTS 58-33570  2/1983  Japan ..................................... 74/493

Primary Examiner—Allen D. Herrmann
Attorney, Agent, or Firm—Finnegan, Henderson, Farabow, Garrett & Dunner

[57] ABSTRACT

A telescopic assembly includes a yoke supported for rotation on a stationary member, a shaft fitted in telescoping relation inside the yoke, rotatably supported by a movable bracket and capable of being reciprocated together with the movable bracket relative to the yoke, a screw rotatably retained by a stationary bracket, and a nut threadedly engaged with the screw and fixed to the movable bracket. When the screw is rotated, the nut provided on the movable bracket moves axially along the screw so that the movable bracket is moved toward or away from the stationary bracket. Hence, the shaft supported by the movable bracket is displaced axially forward or backward, depending upon the direction of screw rotation, relative to the yoke, thereby enabling the portion of the shaft projecting from the yoke to be adjusted in length.

4 Claims, 4 Drawing Figures

TELESCOPIC ASSEMBLY

BACKGROUND OF THE INVENTION

1. Field of the Invention

This invention relates to a telescopic assembly of the type which can be utilized in a telescopic steering assembly of an automotive vehicle. More particularly, the telescopic assembly is of the type having a shaft fitted in nested relation inside a yoke supported on a stationary member, the arrangement being such that the yoke is rotated by rotating the shaft.

2. Description of the Prior Art

A conventional telescopic assembly of the above-described type is described in the specification of U.S. Pat. No. 3,396,600. This conventional assembly includes a pair of shafts arranged in telescoping relation, a yoke rotatably retained by a stationary bracket fixedly secured to a vehicle body, a movable bracket for rotatably retaining the shaft on the input side, a nut rotatably attached to the stationary bracket, and a screw secured to the movable bracket, with the nut being threadedly engaged with the screw. When the nut is rotated by means such as a motor, the screw threadedly engaged therewith travels back and forth, depending upon the direction in which the nut is rotated. Accordingly, the movable bracket to which the screw is secured moves relative to the stationary bracket, thereby displacing the steering shaft in the axial direction. Rotation of the nut is halted when the steering shaft attains the desired length. Thus, by virtue of the threaded engagement between the nut and screw, the steering shaft can be set to and maintained at a desired length.

Since the screw is secured to the movable bracket and the nut threadedly engaged with the screw is rotatably retained by the stationary bracket in the foregoing conventional assembly, the total axial displacement of the screw from one side of the stationary nut to the other is approximately twice the axial length of the screw. Consequently, the space required for the screw on the steering shaft is unnecessarily large and constitutes a drawback of the conventional assembly.

SUMMARY OF THE INVENTION

Accordingly, an object of the present invention is to provide a telescopic assembly in which less space is required for the provision of the screw.

Another object of the present invention is to provide a telescopic assembly in which the screw can readily be brought into a precise parallel relation with a shaft arranged in nested relation inside a yoke.

According to the present invention, the foregoing objects are attained by providing a telescopic assembly in which a nut is supported on a movable bracket and a screw with which the nut is threadedly engaged is rotatably supported on a stationary bracket. More specifically, the assembly includes a yoke axially supported on a stationary member. A shaft fitted in nested relation inside the yoke is rotatably supported by a movable bracket and is capable of being reciprocated together with the movable bracket relative to the yoke. A screw is rotatably retained by a stationary bracket and a nut threadely engaged with the screw is supported on the movable bracket. The screw has one end axially supported by the stationary bracket proper and another end axially supported by a member fixedly secured to the stationary bracket.

When the shaft is turned, the yoke in nested relation with the shaft is rotated. When the screw is rotated, the nut retained by the movable bracket moves axially along the screw so that the movable bracket is reciprocated relative to the stationary bracket. As a result, the shaft supported by the movable bracket is displaced axially forward or backward, depending upon the direction of screw rotation, relative to the yoke, thereby enabling the portion of the shaft projecting from the yoke to be adjusted in length. Thus, since the screw is not reciprocated axially of the shaft, the only space needed for disposing the screw alongside the shaft is that defined by the dimensions of the screw. This makes it unnecessary to provide an axially extending space equivalent to twice the length of the screw to allow for the range of axial travel of the screw as in the prior art.

Further, according to the present invention, both ends of the screw are axially supported by the stationary bracket proper and by the screw bracket secured to the stationary bracket. Accordingly, a highly precise parallel relation is readily obtained between the central axes of the screw and shaft. The nut threadedly engaged with the screw may therefore travel along the screw smoothly without the nut being pressed against the screw from the side due to poor parallel alignment. Moreover, the use of the screw bracket axially supporting one end of the screw makes adjustment easier for establishing the parallel relation between the screw and shaft.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
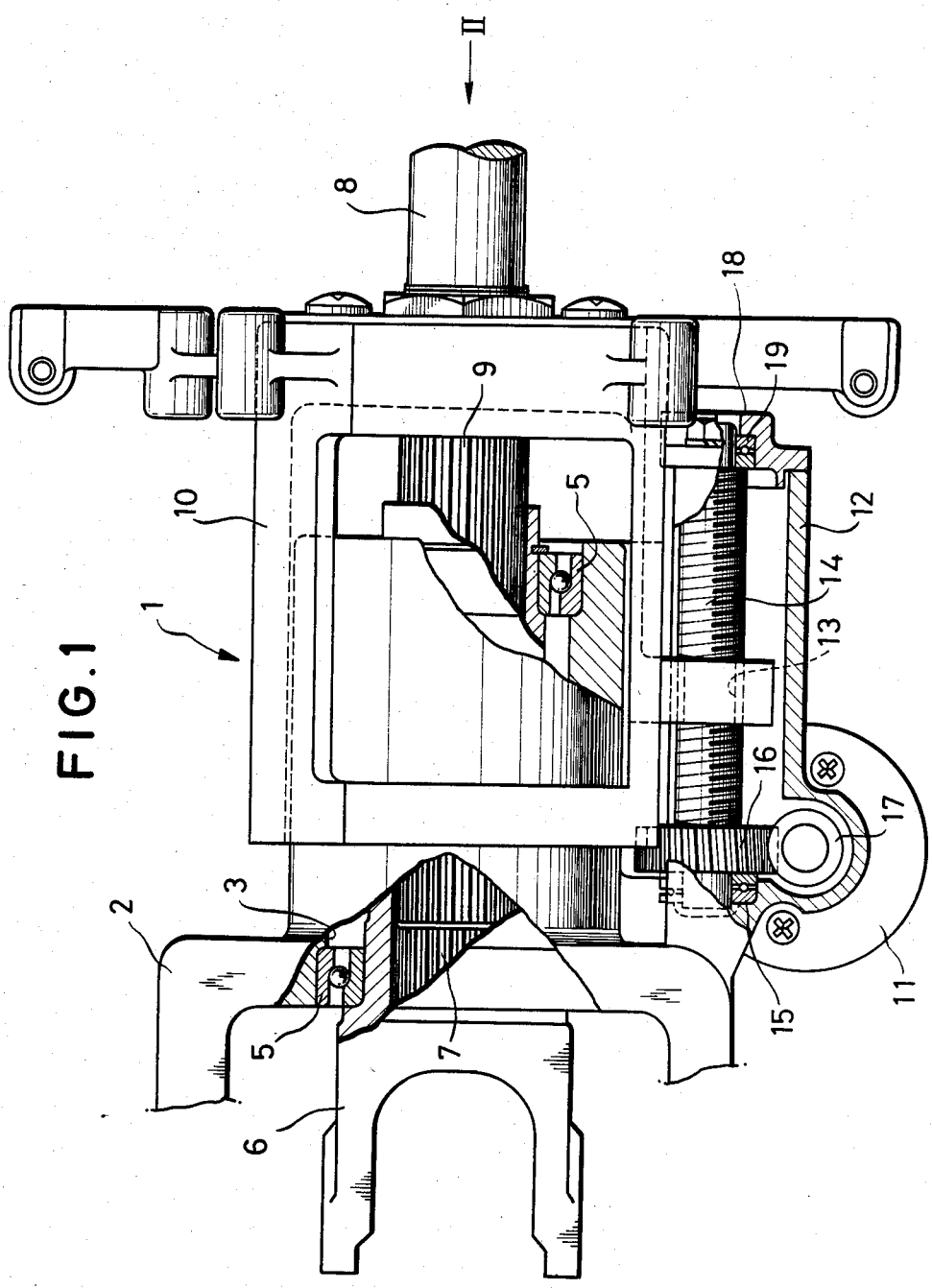
FIG. 1 is a front view, partly in section and with parts broken away, illustrating an embodiment of a telescope assembly according to the present invention.

Turning now to the drawings, a telescopic assembly embodying the present invention and indicated generally by the reference numeral 1 includes a stationary bracket 2 fixedly secured to, e.g., a vehicle body. The stationary bracket 2 has a generally central opening 3 rotatably supporting a yoke 6 via bearings 5. The yoke 6 has a central bore the inner surface of which is provided with a serrated portion 7. A shaft 8 has a serrated portion 9 on its outer surface and is inserted into the serrated portion 7 of yoke 6 in telescoping, non-rotational relation with respect to the yoke. The telescopic assembly 1 further includes a movable bracket 10 supporting the shaft 8 via bearings, not shown. The shaft 8 and the bracket 10 are arranged so that the shaft 8 may rotate independently of the movable bracket 10, but so that fore and aft movement of the shaft 8 causes the movable bracket 10 to move toward or away from the yoke 6. As a result, rotating shaft 8 causes the yoke 6 to rotate in unison therewith, and moving the shaft 8 fore and aft simultaneously reciprocates the movable bracket 10 so that the position of shaft 8 relative to yoke 6 can be changed by virtue of the serrated portions 7, 9. Thus, if a mechanical element such as, for example, a steering wheel is attached to the distal end of shaft 8, the fore and aft position of the steering wheel can be adjusted for maximum comfort.

As shown in FIG. 1, a drive unit 11 such as an electrically powered motor is arranged below the stationary bracket 2. Provided on the bottom portion of the stationary bracket 2 along the movable bracket 10 is a leg portion 12 having a substantially C-shaped cross section. The leg portion 12 defines a recess into the interior whereof extends a nut 13 formed as an integral part of the movable bracket 10. A screw 14 is threadedly engaged with the nut 13 and is received in the leg portion 12. The screw 14 has one end thereof axially supported by a bearing 15 on the wall of the stationary bracket proper. Secured to the screw 14 is a worm wheel 16 threadedly engaged with a worm 17 secured to a drive shaft of the drive unit 11. As shown in FIG. 1, the leg portion 12 has a right end face to which a screw bracket 18 is fixedly secured. The other end of the screw 14 is axially supported by the screw bracket 18 as by a bearing 19 in such a manner that the central axes of the screw 14 and shaft 8 lie parallel to each other.

Thus, the screw 14 has both its ends axially supported on the stationary bracket 2 and is fixed against axial movement but capable of rotating via the bearings 15, 19. The fact that both ends of the screw 14 are supported by the stationary bracket 2 facilitates adjustment for bringing the central axis of the screw 14 into parallel relation with the central axes of the shaft 8 and yoke 9. This assures that the nut 13 will travel smoothly along the screw 14 without binding caused by lack of a true parallel alignment.

Figure 2:
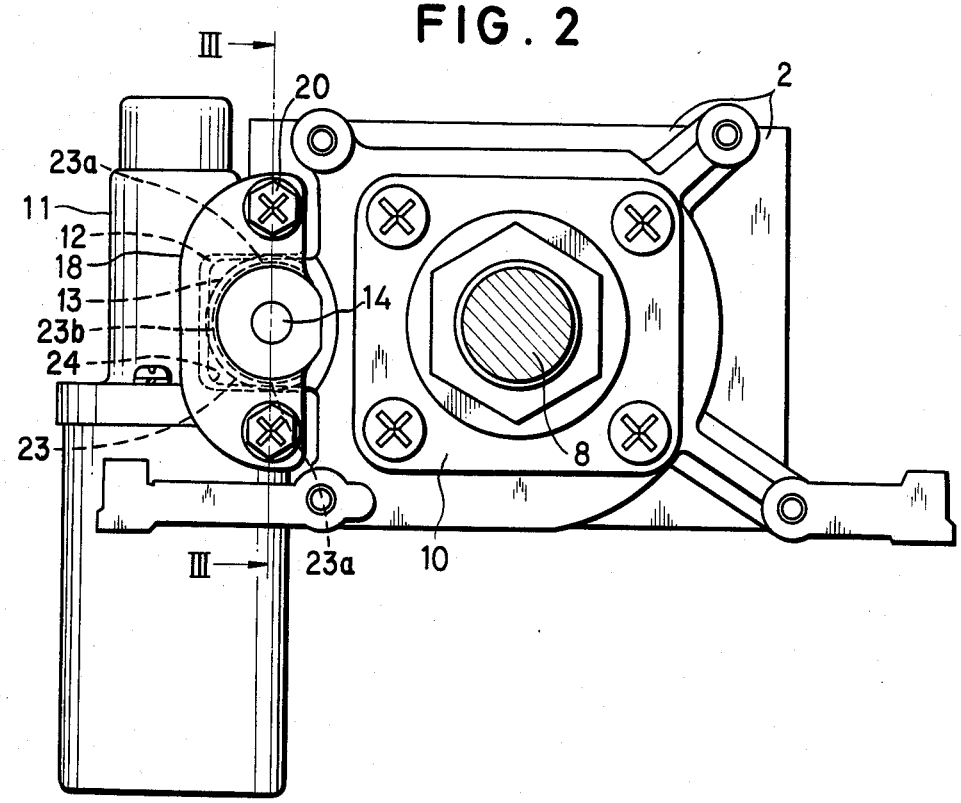
FIG. 2 is a side view looking in the direction of arrow II of FIG. 1.
Figure 4:
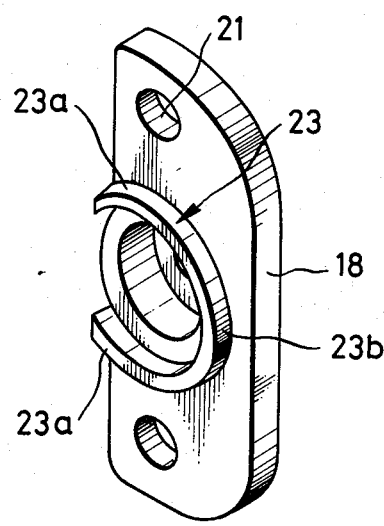
FIG. 4 is a perspective view of a screw bracket.
Figure 3:
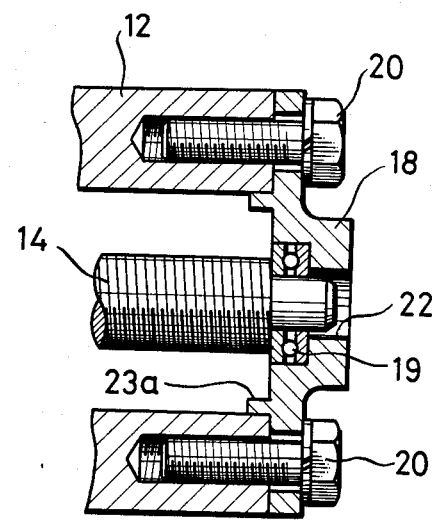
FIG. 3 is a sectional view looking in the direction of arrow III of FIG. 2.

It is particularly advantageous if the screw bracket 18 is shaped as illustrated in FIGS. 3 and 4. As shown, the screw bracket 18 has through-holes 21 at its upper and lower ends for receiving respective bolts 20 screwed into the end face of leg portion 12 to secure the screw bracket to the leg portion. The screw bracket 18 is also formed to include a central hub 22 in which the bearing 19 is fitted. One end of the screw 14 is inserted into the bearing 19 and is rotatably retained thereby. The screw bracket 18 further includes an annular, partially cutaway engagement projection 23 extending toward the leg portion 12. The projection 23 has upper and lower portions 23a which come into circumferentially extending surface 24 contact with the inner wall surface of the leg portion 12 at its upper and lower sides when the screw bracket 18 is attached to the stationary bracket 2. The engagement projection portions 23a thus serve to position the screw bracket 18 vertically (as seen in FIG. 2) with respect to the stationary bracket 2 when the portions 23a contact the inner wall surface 24 on the upper and lower portions of leg portion 12 (as seen in FIG. 2). This makes it possible to bring the central axis of screw 14 into a parallel relation with the central axis of shaft 8 merely by adjusting the position of the screw bracket to the left or right (as seen in FIG. 2). Furthermore, the engagement projection 23 includes a side portion 23b which when brought into circumferential surface contact with the inner wall surface 24 of the leg portion 12 positions the screw bracket 18 in the left and right directions (as seen in FIG. 2).

In operation, the worm 17 drives the worm wheel 16 into rotation when the drive motor 11 is turned on. The worm wheel 16 rotates the screw 14 in a predetermined direction, which is decided by the direction in which the motor is instructed to rotate. The rotating screw 14 causes the nut 13 fixedly secured to the movable bracket 10 to advance or retract, thus transporting the movable bracket 10 toward or away from the yoke 6. Since the movable bracket 10 carries the shaft 8 via the bearings 5, the shaft 8 is moved toward or away from the yoke 6, thereby adjusting the length of that portion of shaft 8 projecting from the yoke 6. Since the screw 14 is axially supported at both its ends by the stationary bracket 2, the screw 14 and shaft 8 always remain parallel to assure that the nut 13 will travel smoothly along the screw 14.

As many apparently widely different embodiments of the present invention can be made without departing from the spirit and scope thereof, it is to be understood that the invention is not limited to the specific embodiments thereof except as defined in the appended claims.

What we claim is:

1. A telescopic assembly comprising:
a stationary bracket;
a yoke rotatably supported by said stationary bracket, said yoke having a central bore;
a movable bracket disposed to reciprocate with respect to said yoke;
a shaft axially supported by said movable bracket and having an end reciprocatably inserted into the bore of said yoke and arranged to rotate said yoke upon rotation of said shaft;
a screw having a first end and a second end, said first end being rotatably supported by said stationary bracket;
support means secured to said stationary bracket for rotatably supporting the second end of said screw;
said stationary bracket and said support means being adapted to support said screw in parallel relation with said shaft;
drive means fixed with respect to said stationary bracket for rotating said screw; and
a nut threadedly engaged with said screw and retained by said movable bracket so as to be fixed against rotation.

2. The telescopic assembly according to claim 1, wherein said support means comprises a screw bracket fixedly attached to said stationary bracket, said screw bracket having a bearing for rotatably supporting the second end of said screw and engaging means for engaging said stationary bracket to position said screw bracket relative thereto when said screw bracket is attached to said stationary bracket.

3. A telescopic assembly comprising:
a stationary bracket;
a yoke rotatably supported by said stationary bracket, said yoke having a central bore;
a movable bracket disposed to reciprocate with respect to said yoke;
a shaft axially supported by said movable bracket and having an end reciprocably inserted into the bore of said yoke and arranged to rotate said yoke upon rotation of said shaft;
a screw having a first end and a second end, said first end being rotatably supported by said stationary bracket;
a screw bracket fixedly attached to said stationary bracket, said screw bracket having a bearing for rotatably supporting the second end of said screw and having a first engaging surface on a side surface of the screw bracket being engagable with a complementary second engaging surface on said stationary bracket, said first and second engaging surfaces engaging each other to position said screw in parallel relation with said shaft;

drive means fixed with respect to said stationary bracket for rotating said screw; and a nut threadedly engaged with said screw and retained by said movable bracket so as to be fixed against rotation.

4. The telescopic assembly according to claim 3, wherein said first engaging surface includes a projection on said side surface of the screw bracket and said second engaging surface includes an inner wall surface of the stationary bracket.

* * * * *